(12) United States Patent
Venkatachari et al.

(10) Patent No.: US 11,589,406 B2
(45) Date of Patent: Feb. 21, 2023

(54) DUAL CONNECTIVITY OPERATIONS IN SLOT TIMING DRIFT SCENARIOS

(71) Applicant: QUALCOMM Incorporated, San Diego, CA (US)

(72) Inventors: Harish Venkatachari, San Jose, CA (US); Arvind Vardarajan Santhanam, San Diego, CA (US); Sandeep Rao, San Diego, CA (US); Ashwin Alur Sreesha, San Jose, CA (US); Hemanth Kumar Rayapati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 17/102,940

(22) Filed: Nov. 24, 2020

(65) Prior Publication Data

US 2021/0160942 A1    May 27, 2021

Related U.S. Application Data

(60) Provisional application No. 62/940,760, filed on Nov. 26, 2019.

(51) Int. Cl.
*H04W 24/10* (2009.01)
*H04W 76/15* (2018.01)
*H04L 1/00* (2006.01)
*H04W 76/19* (2018.01)

(52) U.S. Cl.
CPC ........... *H04W 76/15* (2018.02); *H04L 1/0038* (2013.01); *H04W 24/10* (2013.01); *H04W 76/19* (2018.02)

(58) Field of Classification Search
CPC ..... H04W 76/15; H04W 24/10; H04W 76/19; H04W 88/06; H04W 76/34; H04L 1/0038
See application file for complete search history.

(56) References Cited

U.S. PATENT DOCUMENTS

2018/0124612 A1* 5/2018 Babaei ............ H04W 74/0833
2018/0359790 A1* 12/2018 Ingale ..................... H04W 8/22
2018/0368199 A1* 12/2018 Zeng ..................... H04W 76/15

* cited by examiner

*Primary Examiner* — Chuong A Ngo
(74) *Attorney, Agent, or Firm* — Harrity & Harrity, LLP

(57) ABSTRACT

Various aspects of the present disclosure generally relate to wireless communication. In some aspects, a user equipment (UE) may determine whether a slot timing difference, between a first cell and a second cell for a dual connectivity mode, satisfies a threshold value, where the first cell is a serving cell associated with a first radio access technology (RAT) and the second cell is a serving cell or a candidate cell associated with a second RAT. The UE may perform an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value. Numerous other aspects are provided.

30 Claims, 9 Drawing Sheets

DUAL CONNECTIVITY OPERATIONS IN SLOT TIMING DRIFT SCENARIOS

CROSS-REFERENCE TO RELATED APPLICATION

This patent application claims priority to U.S. Provisional Patent Application No. 62/940,760, filed on Nov. 26, 2019, entitled "DUAL CONNECTIVITY OPERATIONS IN SLOT TIMING DRIFT SCENARIOS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for dual connectivity operations in slot timing drift scenarios.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining whether a slot timing difference, between a first cell and a second cell for a dual connectivity mode, satisfies a threshold value, wherein the first cell is a serving cell associated with a first radio access technology (RAT) and the second cell is a serving cell or a candidate cell associated with a second RAT; and performing an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value.

In some aspects, a UE for wireless communication may include memory and one or more processors operatively coupled to the memory. The memory and the one or more processors may be configured to determine whether a slot timing difference, between a first cell and a second cell for a dual connectivity mode, satisfies a threshold value, wherein the first cell is a serving cell associated with a first RAT and the second cell is a serving cell or a candidate cell associated with a second RAT; and perform an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value.

In some aspects, a non-transitory computer-readable medium may store one or more instructions for wireless communication. The one or more instructions, when executed by one or more processors of a UE, may cause the one or more processors to: determine whether a slot timing difference, between a first cell and a second cell for a dual connectivity mode, satisfies a threshold value, wherein the first cell is a serving cell associated with a first RAT and the second cell is a serving cell or a candidate cell associated with a second RAT; and perform an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value.

In some aspects, an apparatus for wireless communication may include means for determining whether a slot timing difference, between a first cell and a second cell for a dual connectivity mode, satisfies a threshold value, wherein the first cell is a serving cell associated with a first RAT and the second cell is a serving cell or a candidate cell associated with a second RAT; and means for performing an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
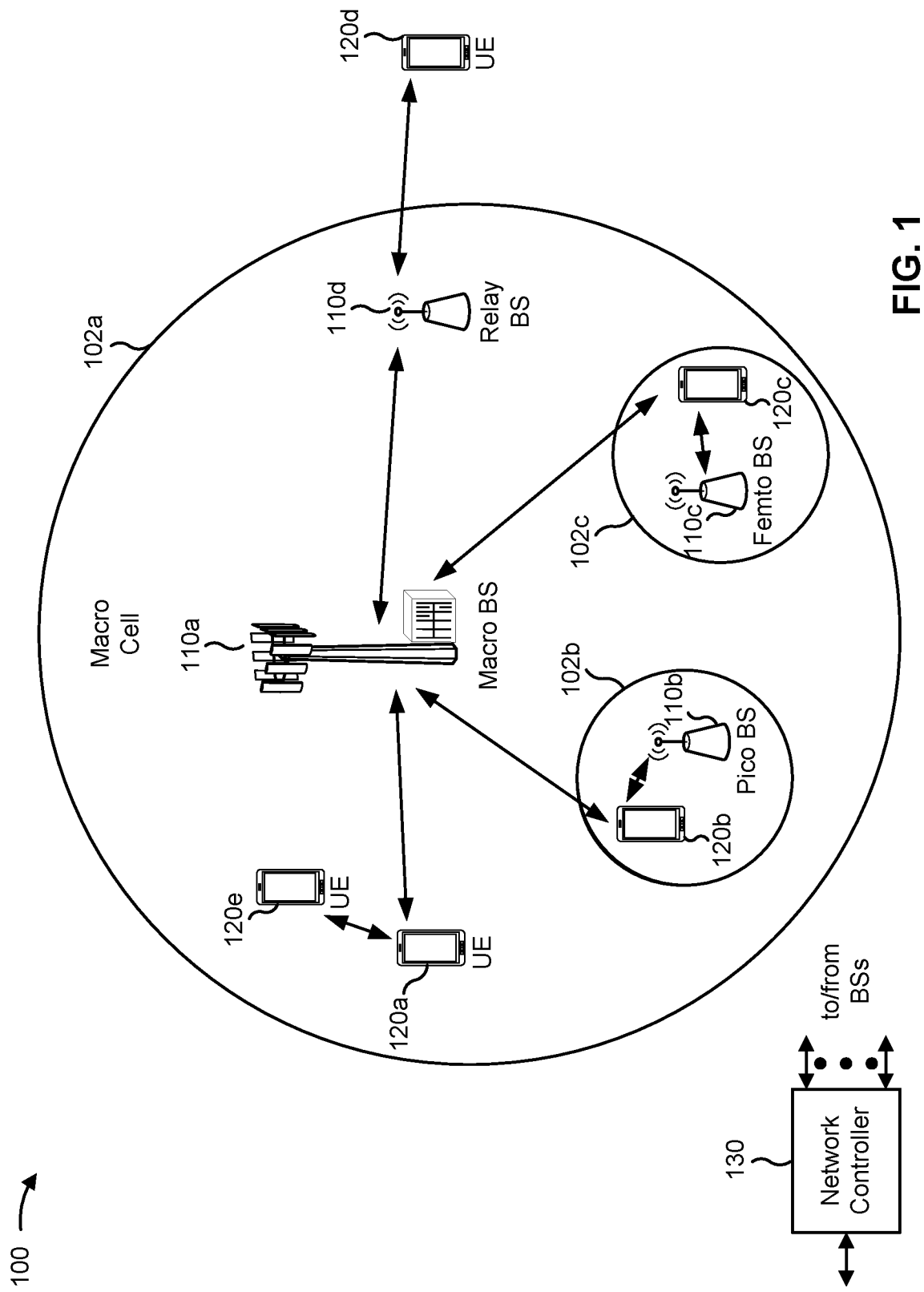
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be a Long Term Evolution (LTE) network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between BS 110a and UE 120d. A relay base station may also be referred to as a relay BS, a relay station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
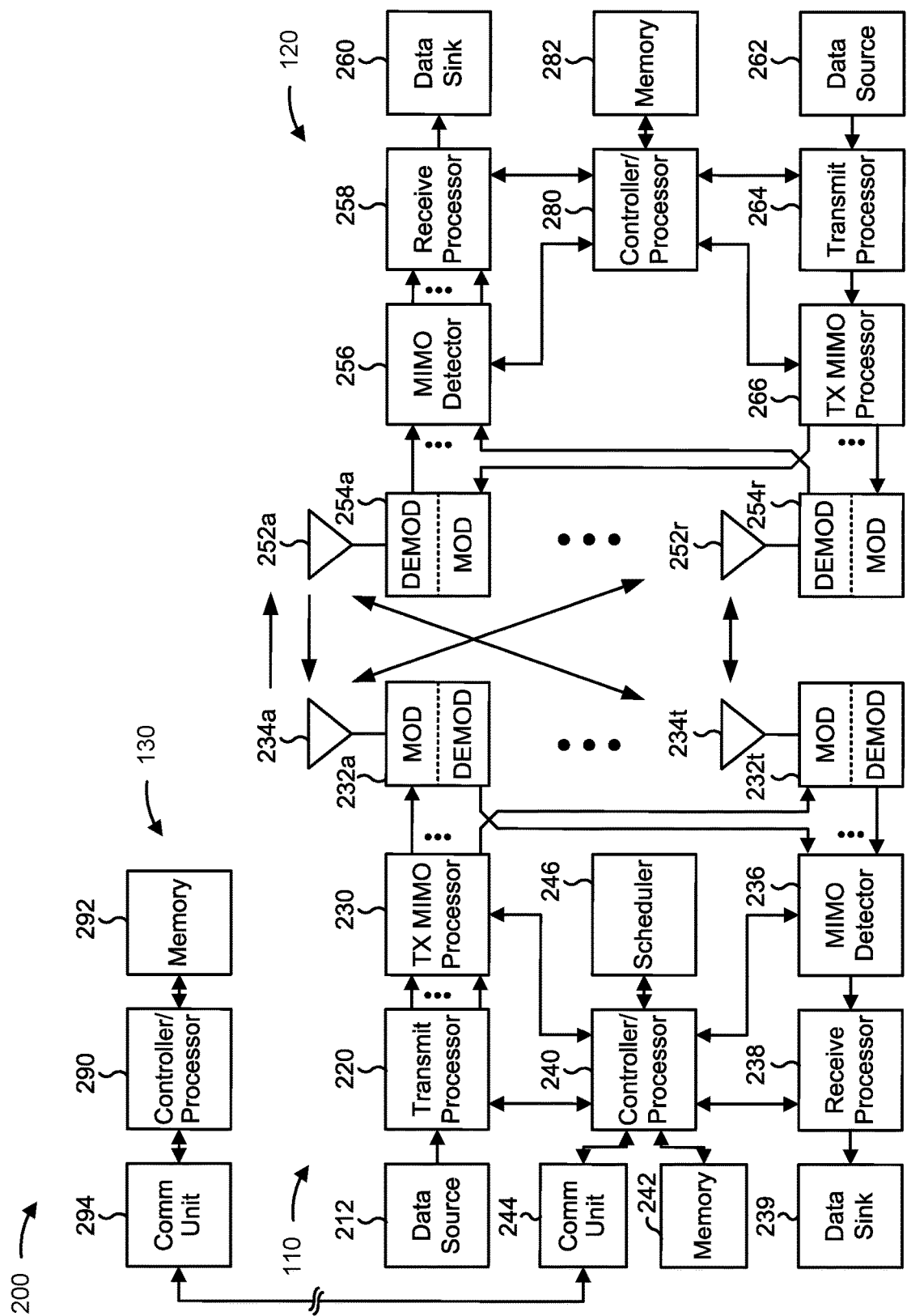
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with dual connectivity operations in slot timing drift scenarios, as described in more detail elsewhere herein. For example, controller/processor 240 of base station 110, controller/processor 280 of UE 120, and/or any other component(s) of FIG. 2 may perform or direct operations of, for example, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7, and/or other processes as described herein. A scheduler 246 may schedule UEs for data transmission on the downlink and/or uplink.

In some aspects, UE 120 may include means for determining whether a slot timing difference, between a first cell and a second cell for a dual connectivity mode, satisfies a threshold value, where the first cell is a serving cell associated with a first radio access technology (RAT) and the second cell is a serving cell or a candidate cell associated with a second RAT, means for performing an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
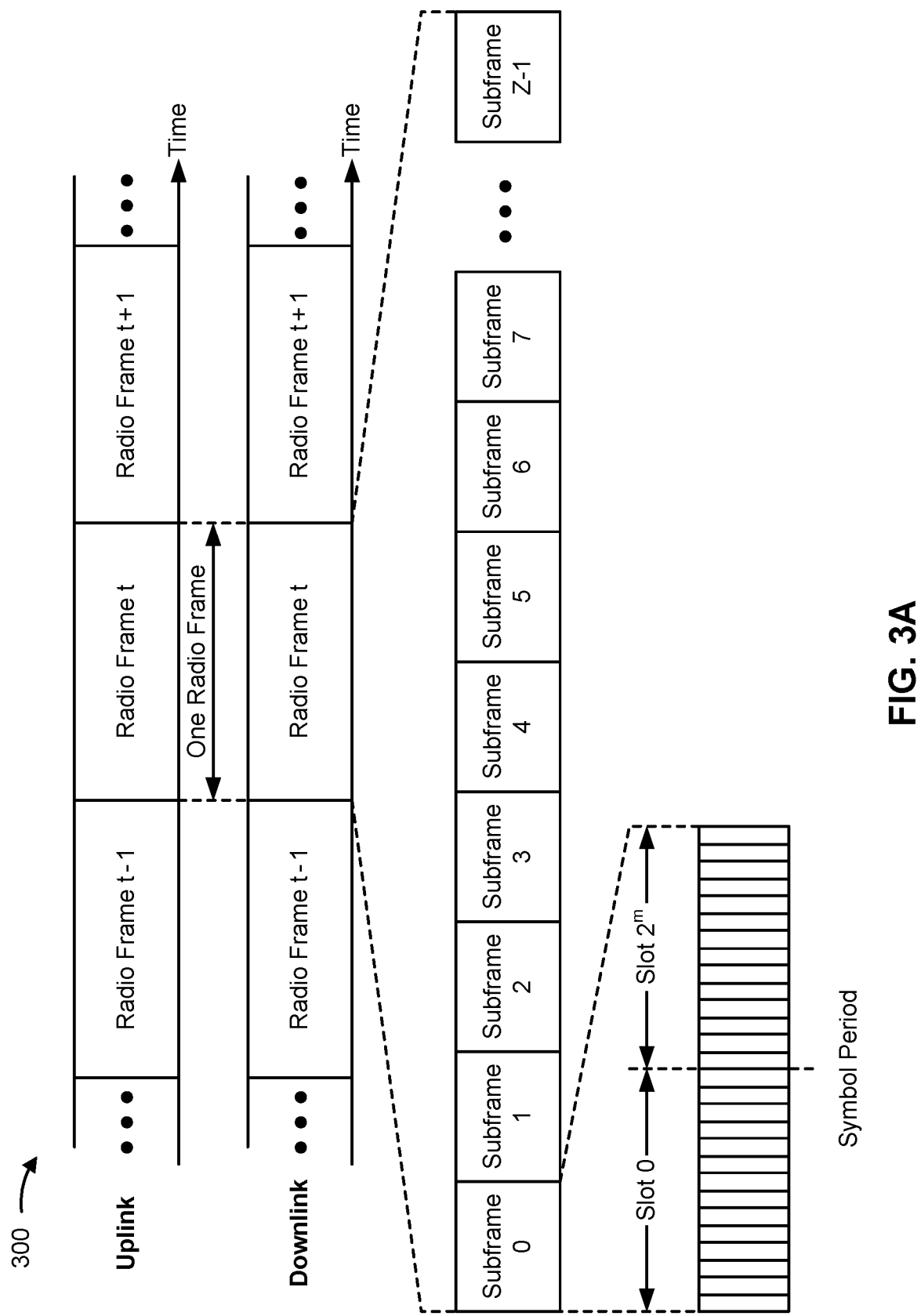
FIG. 3A is a diagram illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
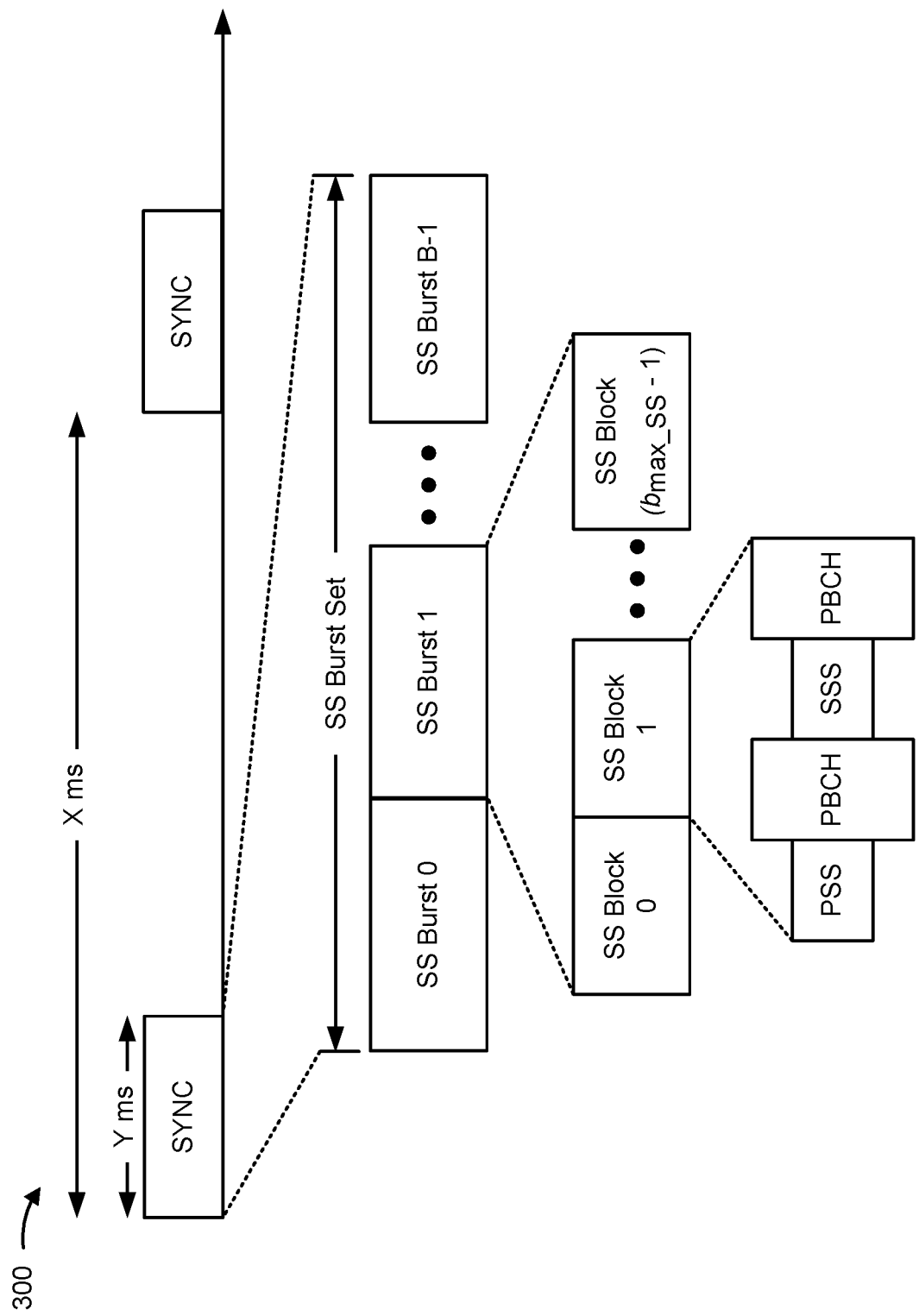
FIG. 3B is a diagram illustrating an example synchronization communication hierarchy in a wireless communication network, in accordance with various aspects of the present disclosure.

FIG. 3B is a diagram illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
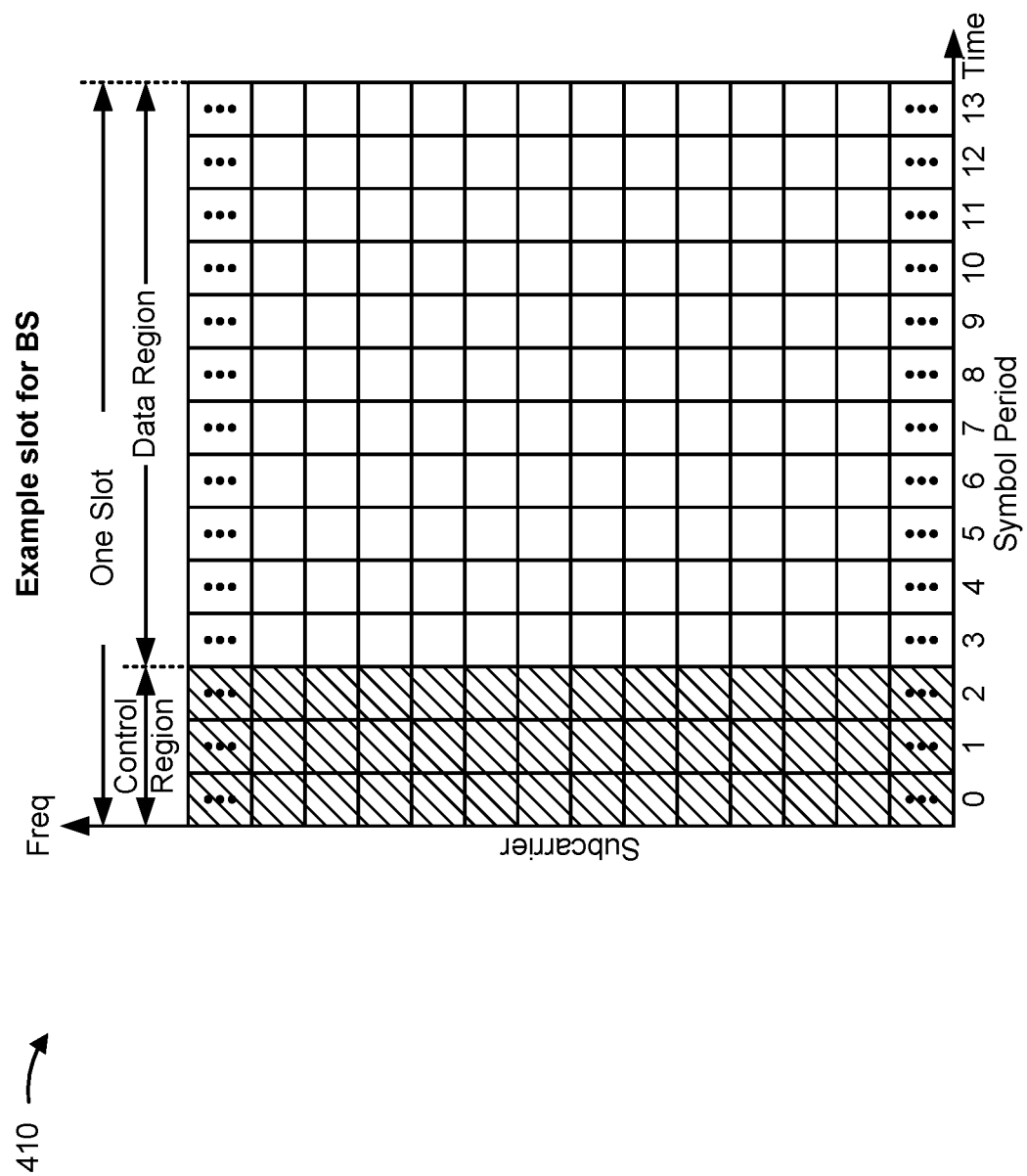
FIG. 4 is a diagram illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
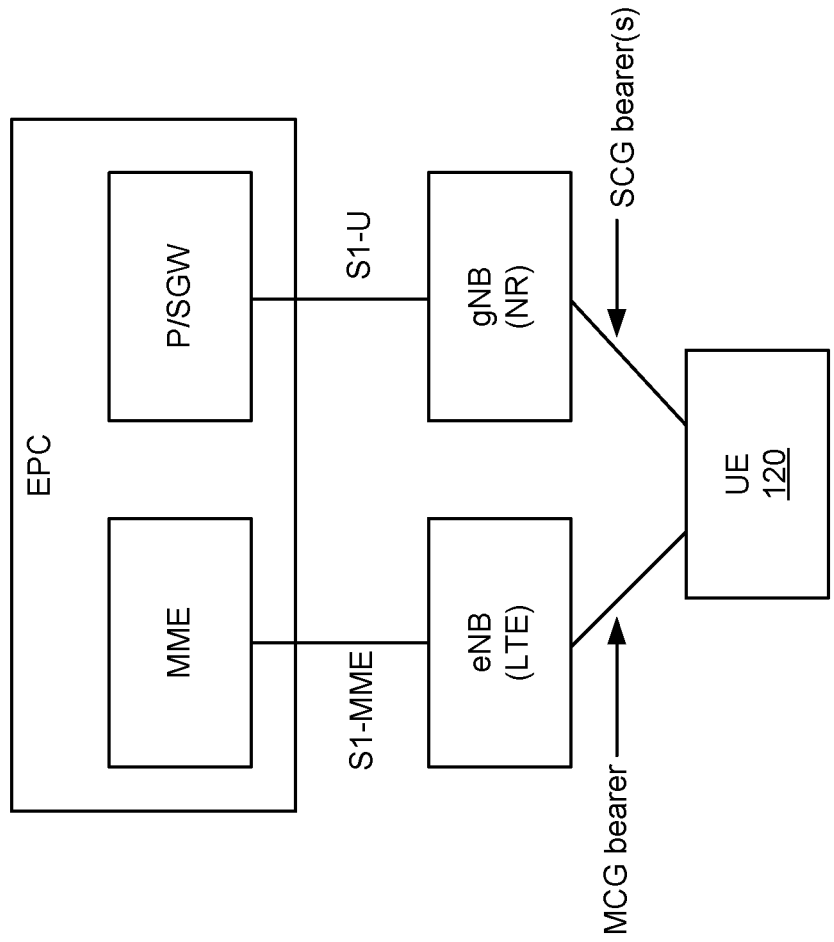
FIG. 5 is a diagram illustrating an example New Radio non-standalone architecture, in accordance with various aspects of the present disclosure.

FIG. 5 is a diagram illustrating an example NR non-standalone (NSA) architecture, in accordance with various aspects of the present disclosure.

As shown in FIG. 5, in an NR or 5G NSA mode, a UE 120 may communicate with both an eNB (e.g., a 4G base station 110) and a gNB (e.g., a 5G base station 110), and the eNB and the gNB may communicate (directly or indirectly) with a 4G/LTE core network, shown as an evolved packet core (EPC) that includes a mobility management entity (MME), a packet data network gateway (PGW), a serving gateway (SGW), and/or the like. In FIG. 5, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 5, in some aspects, a wireless network that permits operation in a 5G NSA mode may permit such operations using a master cell group (MCG) for a first RAT (e.g., an LTE RAT, a 4G RAT, and/or the like) and a secondary cell group (SCG) for a second RAT (e.g., an NR RAT, a 5G RAT, and/or the like). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, control plane information, and/or the like), and the SCG may be added as additional carriers to increase throughput (e.g., for data traffic, user plane information, and/or the like). In some aspects, the gNB and the eNB may not transfer user plane information between one another.

In some aspects, the 5G NSA mode may be an Evolved Universal Mobile Telecommunications System Terrestrial Radio Access (E-UTRA)-NR dual connectivity (ENDC) mode or a NR-E-UTRA dual connectivity (NEDC) mode. In some aspects, a UE 120 operating in the ENDC mode or the NEDC mode may have dual connectivity with an LTE base station 110 (e.g., an eNB) and an NR base station 110 (e.g., a gNB).

When a UE 120 is operating in the 5G NSA mode, a slot timing difference between a primary cell (PCell) of the MCG and a primary secondary cell (PSCell) of the SCG may occur due to slot boundary drift, in which slot timings of the PCell and the PSCell are not synchronized. In some cases, for example, the slot timing difference may result in overlapping slots for the PCell and the PSCell. In such cases, the slot timing difference may result in damage to the UE 120 and/or communication performance losses.

For example, when the 5G NSA mode is operating on overlapping time division duplexing (TDD) frequency bands, the UE 120 may use radio frequency (RF) components of the UE 120 for communications with both the PCell and the PSCell. Accordingly, if the UE 120 is transmitting to the PSCell at high power while concurrently receiving from the PCell (e.g., due to overlapping downlink and uplink slots), the high power transmission may damage an RF component, such as a low noise amplifier, of the UE 120 being used for reception. As another example, when the 5G NSA mode is operating on overlapping frequency division duplexing (FDD) frequency bands, a gain state change to a communication of one cell may result in a gain state change to a communication of another cell. In some cases, due to overlapping slots, such a gain state change may occur in the middle of a slot, thereby affecting communication performance.

Some techniques and apparatuses described herein enable a UE 120, operating in a dual connectivity mode, to terminate dual connectivity with a PSCell, and/or prevent dual connectivity with a candidate PSCell, based at least in part on a slot timing difference between the PSCell and a PCell associated with the dual connectivity mode. For example, the UE 120 may terminate and/or prevent dual connectivity based at least in part on a determination that the slot timing difference satisfies a threshold value. In this way, damage to the UE 120 and/or communication performance losses resulting from slot overlap may be avoided.

As indicated above, FIG. 5 is provided as an example. Other examples may differ from what is described with respect to FIG. 5.

Figure 6:
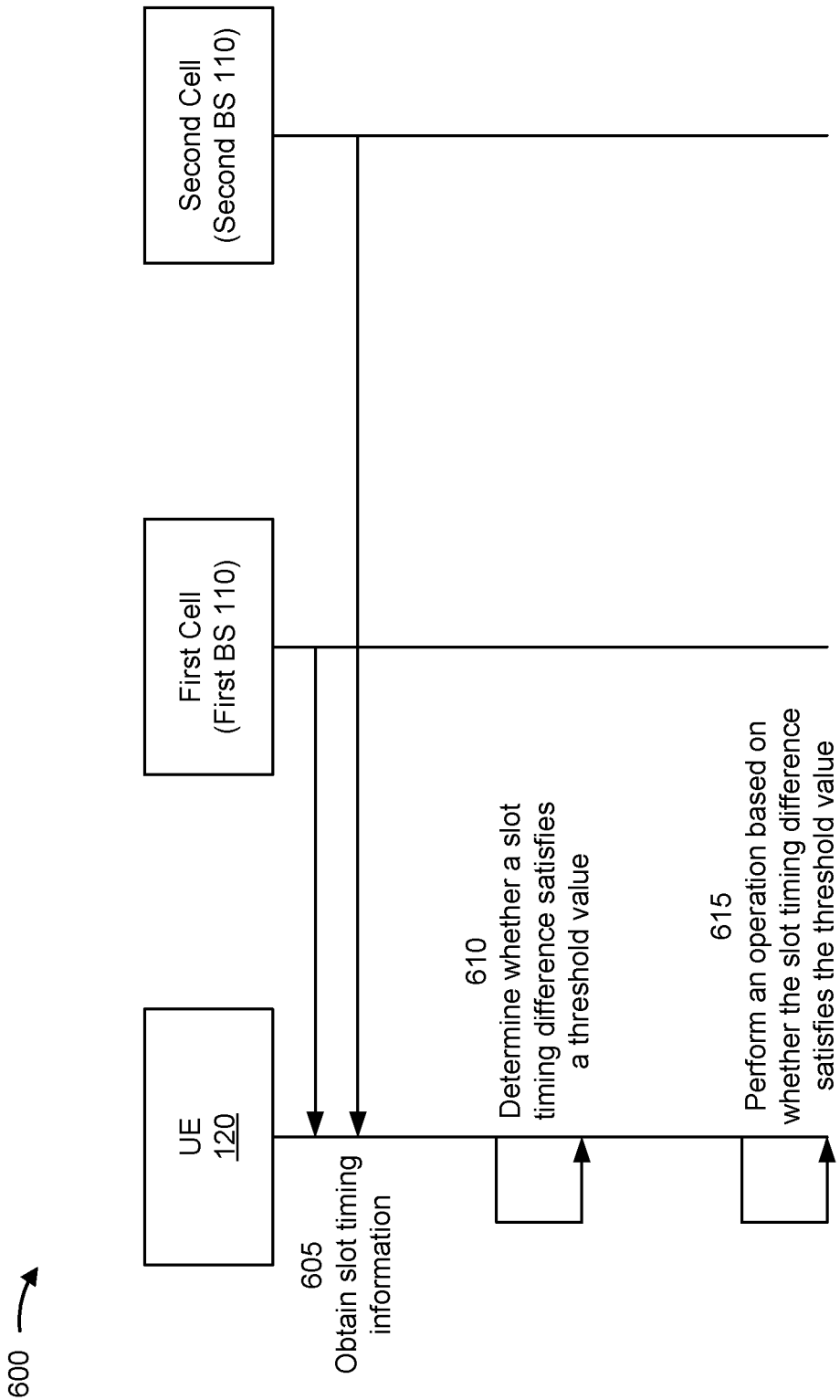
FIG. 6 is a diagram illustrating an example of dual connectivity operations in slot timing drift scenarios, in accordance with various aspects of the present disclosure.

FIG. 6 is a diagram illustrating an example 600 of dual connectivity operations in slot timing drift scenarios, in accordance with various aspects of the present disclosure. As shown in FIG. 6, a UE 120 may be operating in a dual connectivity mode with a first cell (e.g., a PCell) of a first cell group (e.g., an MCG), associated with a first BS 110, and a second cell (e.g., a PSCell) of a second cell group (e.g., a SCG) associated with a second BS 110. In some aspects, the second cell may be a candidate cell for dual connectivity with the first cell.

In some aspects, the dual connectivity mode may be a 5G NSA mode. For example, the first cell may be associated with a first RAT (e.g., the first BS 110 may be associated with the first RAT) and the second cell may be associated with a second RAT (e.g., the second BS 110 may be associated with the second RAT). As an example, the first RAT may be one of an LTE RAT or an NR RAT, and the second RAT may be the other of the LTE RAT or the NR RAT. In some aspects, the 5G NSA mode may be an ENDC mode in which the first cell (e.g., the PCell) is associated with an LTE RAT and the second cell (e.g., the PSCell) is associated with an NR RAT. In some aspects, the 5G NSA mode may be an NEDC mode in which the first cell (e.g., the PCell) is associated with an NR RAT and the second cell (e.g., the PSCell) is associated with an LTE RAT.

In some aspects, the first cell and the second cell may be co-located (e.g., at the same BS 110). In some aspects, the first cell and the second cell may use overlapping frequency bands (e.g., TDD frequency bands or FDD frequency bands). In some aspects, the first cell and the second cell may be non-co-located or may use non-overlapping frequency bands (e.g., when UE 120 is multi-subscriber identity module (MSIM) enabled).

As shown in FIG. 6, and by reference number 605, UE 120 may obtain slot timing information for the first cell and the second cell. For example, UE 120 may measure a PSS and/or an SSS transmitted by the first BS 110 for the first cell in order to determine a slot timing of the first cell. Similarly, UE 120 may measure a PSS and/or an SSS transmitted by the second BS 110 for the second cell in order to determine a slot timing of the second cell. In some aspects, UE 120 may determine a slot timing of the first cell and a slot timing of the second cell based at least in part on a timing of transmissions made by UE 120 on the first cell and the second cell, respectively. In some aspects, a slot timing may relate to a timing of slots, mini-slots, symbols, and/or the like.

In some aspects, UE 120 may obtain the slot timing information for the first cell and/or the second cell while operating in the dual connectivity mode with the first cell and the second cell. In some aspects, UE 120 may obtain the slot timing information for the second cell in connection with a cell search procedure performed by UE 120. For example, the second cell may be a candidate cell or a cell indicated to UE 120 in connection with a blind cell addition procedure, and UE 120 may determine a slot timing of the second cell based at least in part on measurements of the second cell made in connection with the cell search procedure.

As shown by reference number 610, UE 120 may determine whether a slot timing difference between the first cell and the second cell satisfies a threshold value. For example, in some cases, the slot timings of the first cell and second cell may drift from a synchronized state (e.g., a slot timing difference of 3 microseconds (μs) or less), may be unsynchronized, and/or the like. UE 120 may determine the slot timing difference as a difference between the slot timing of the first cell and the slot timing of the second cell. In some aspects, the slot timing difference may be a maximum receive timing difference (MRTD) or a maximum transmit timing difference (MTTD). In some aspects, the threshold value may be 3 μs or a lesser value, 10 μs or a lesser value, 20 μs or a lesser value, or 150 μs or a lesser value.

As shown by reference number 615, UE 120 may perform an operation in connection with the dual connectivity mode based at least in part on whether the slot timing difference satisfies the threshold value. For example, UE 120 may perform an operation to prevent the dual connectivity mode with the second cell (e.g., when the second cell is a candidate cell in a cell search procedure, or is selected to be a serving cell), establish the dual connectivity mode with the second cell (e.g., when the second cell is a candidate cell, or is selected to be a serving cell), maintain the dual connectivity mode with the second cell (e.g., when the second cell is a serving cell, such as a PSCell), or terminate the dual connectivity mode with the second cell (e.g., when the second cell is a serving cell).

In some aspects, UE 120 may determine (e.g., declare) a radio link failure (RLF) with the SCG of the second cell based at least in part on a determination that the slot timing difference satisfies the threshold value (e.g., exceeds the threshold value). In some aspects, UE 120 may determine the RLF based at least in part on a determination that the slot timing difference satisfies the threshold value over a threshold time period. For example, UE 120 may initiate a timer when the slot timing difference is determined to satisfy the threshold value, and may determine the RLF if the slot timing difference continues to satisfy the threshold value for a duration (e.g., the threshold time period) of the timer. In some aspects, UE 120 may cancel the timer if the slot timing difference fails to satisfy the threshold value (or falls below another threshold value) during the duration of the timer (e.g., the timer may be a hysteresis timer). In some aspects, the threshold time period may be 200 milliseconds (ms) or less.

Based at least in part on determining the RLF, UE 120 may terminate a connection with the second cell, thereby avoiding damage to UE 120 or communication performance losses that may result from the slot timing difference. In some aspects, based at least in part on determining the RLF, the UE 120 may determine whether to terminate a connection with the first cell or the second cell. For example, if the first cell is associated with an NR RAT and the second cell is associated with an LTE RAT, then UE 120 may determine to terminate a connection with the second cell (e.g., the UE 120 may prioritize an NR cell over an LTE cell). As another example, if an active link of the UE 120 with the first cell is associated with a higher scheduling rate than an active link of the UE 120 with the second cell, then the UE 120 may determine to terminate a connection with the second cell (e.g., the UE 120 may prioritize a cell associated with more data transfer with the UE 120 over a cell associated with less data transfer with the UE 120). In some aspects, UE 120 may transmit (e.g., to the first BS 110 associated with the first cell) an indication of the RLF, an indication that the slot timing difference satisfies the threshold value, an indication of the slot timing difference, and/or the like. In some aspects, UE 120 may associate the second cell with an indication of the RLF. For example, UE 120 may flag the second cell to indicate that RLF was determined for the second cell.

In some aspects, UE 120 may perform a cell search procedure after terminating the connection with the second cell. In some aspects, UE 120 may have terminated the connection with the second cell for a reason other than the slot timing difference satisfying the threshold value. In some aspects, UE 120 may perform the cell search procedure after terminating a connection with a PSCell other than the second cell (e.g., when UE 120 was not previously in dual connectivity with the second cell).

According to the cell search procedure, UE 120 may perform measurements of a plurality of candidate cells for dual connectivity, and may transmit (e.g., to the first BS 110 associated with the first cell) measurement reports to enable selection of a new PSCell for dual connectivity with the first cell. In some aspects, in connection with the cell search procedure, UE 120 may not transmit a measurement report for the second cell (e.g., a candidate cell) based at least in part on a determination that a timing difference between the second cell and the first cell satisfies a threshold value (e.g., exceeds the threshold value), as described above. For example, UE 120 may not transmit the measurement report based at least in part on a determination that the timing difference satisfies the threshold value over a threshold time period, as described above.

In some aspects, in connection with the cell search procedure, UE 120 may not transmit a measurement report for the second cell based at least in part on a determination that the second cell is associated with an indication of RLF (e.g., the second cell is flagged), as described above. For example, UE 120 may not transmit the measurement report based at least in part on a determination that the second cell is associated with a quantity of indications of RLF (e.g., occurring over a particular duration) that satisfies a threshold value, and/or that a threshold waiting period since a most recent RLF indication for the second cell has not expired. In this way, UE 120 may prevent selection of the second cell for dual connectivity with the first cell, thereby avoiding damage to UE 120 or communication performance losses that may result from the slot timing difference.

In some aspects, UE 120 may receive (e.g., from the first BS 110 associated with the first cell) an indication to establish dual connectivity with the second cell in connection with a blind cell addition procedure. In other words, the second cell may be selected (e.g., by an EPC) for UE 120 without UE 120 transmitting measurement reports for candidate cells. In some aspects, UE 120 may receive the indication to establish dual connectivity after terminating a connection with the second cell, as described above. In some aspects, UE 120 may receive the indication to establish dual connectivity after terminating a connection with a PSCell other than the second cell (e.g., when UE 120 was not previously in dual connectivity with the second cell).

According to the blind cell addition procedure, UE 120 may perform measurements of the second cell after receiving the indication to establish dual connectivity with the second cell. In some aspects, UE 120 may determine not to establish a connection with the second cell based at least in part on a determination that a timing difference between the second cell and the first cell satisfies a threshold value (e.g., exceeds the threshold value), as described above. In some aspects, UE 120 may make the determination based at least in part on a single measurement of the second cell indicating a timing difference that satisfies the threshold value (e.g., the timing difference need not continue to satisfy the threshold value over a threshold time period, as described above).

In some aspects, in connection with the blind cell addition procedure, UE 120 may determine not to establish a connection with the second cell based at least in part on a determination that the second cell is associated with an indication of RLF (e.g., the second cell is flagged), as described above. In this way, UE 120 may not establish a connection with the second cell for dual connectivity with the first cell, thereby avoiding damage to UE 120 or communication performance losses that may result from the slot timing difference.

In some aspects, UE 120 may maintain or establish dual connectivity with the second cell in a scenario when the slot timing difference between the first cell and the second cell satisfies the threshold value (e.g., exceeds the threshold value). For example, UE 120 may reduce a transmit power used by UE 120 for communicating in the dual connectivity mode with the first cell and the second cell. In other words, UE 120 may use a transmit power that satisfies a threshold value (e.g., is less than the threshold value). In this way, UE 120 may maintain or establish a connection with the second cell for dual connectivity with the first cell while avoiding damage to UE 120 that may result from the slot timing difference.

As indicated above, FIG. 6 is provided as an example. Other examples may differ from what is described with respect to FIG. 6.

Figure 7:
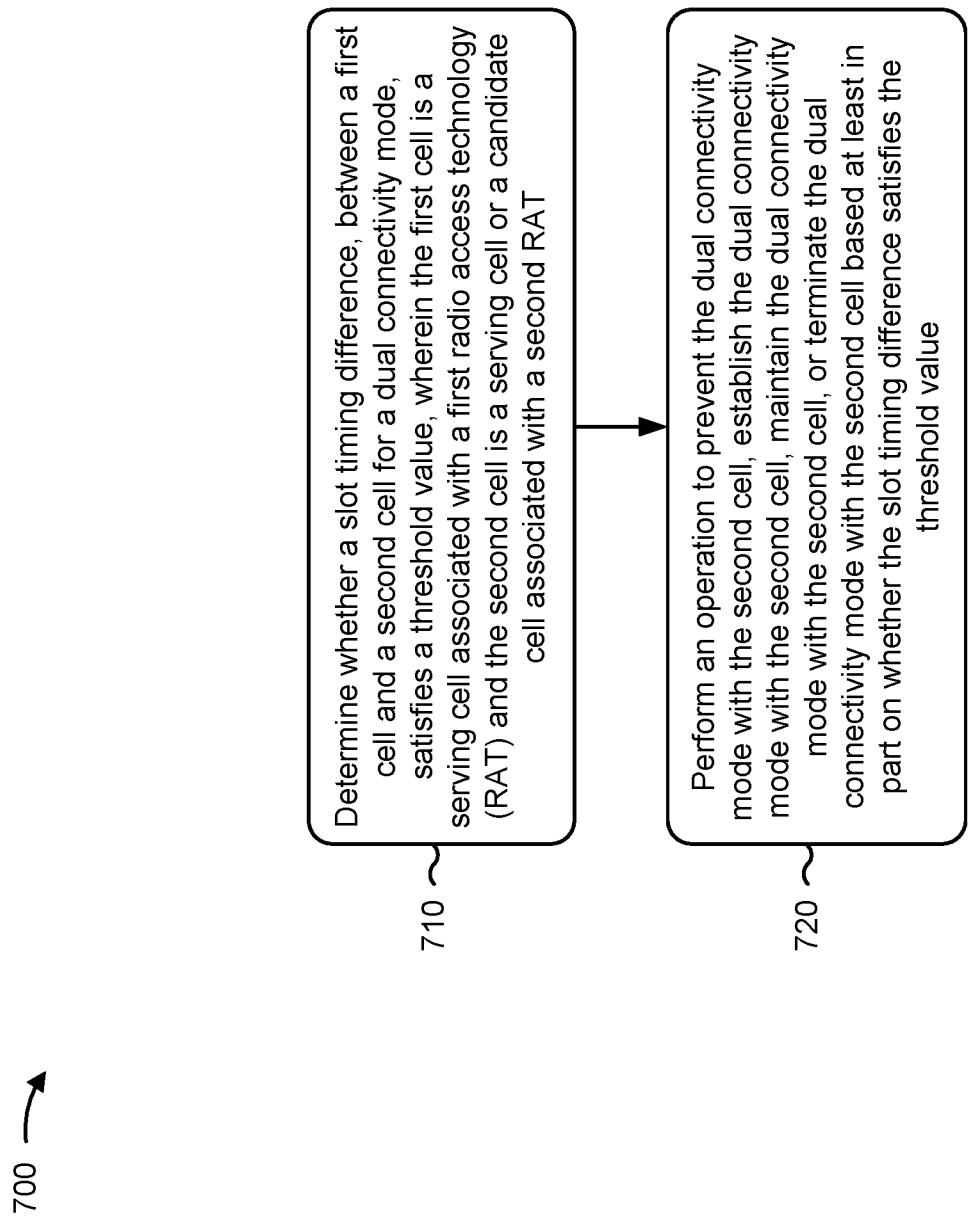
FIG. 7 is a diagram illustrating an example process performed, for example, by a UE, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations associated with dual connectivity operations in slot timing drift scenarios.

As shown in FIG. 7, in some aspects, process 700 may include determining whether a slot timing difference, between a first cell and a second cell for a dual connectivity mode, satisfies a threshold value, wherein the first cell is a serving cell associated with a first RAT and the second cell is a serving cell or a candidate cell associated with a second RAT (block 710). For example, the UE (e.g., using controller/processor 280 and/or the like) may determine whether a slot timing difference, between a first cell and a second cell for a dual connectivity mode, satisfies a threshold value. In some aspects, the first cell is a serving cell associated with a first RAT and the second cell is a serving cell or a candidate cell associated with a second RAT.

As further shown in FIG. 7, in some aspects, process 700 may include performing an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value (block 720). For example, the UE (e.g., using controller/processor 280 and/or the like) may perform an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value.

Process 700 may include additional aspects, such as any single aspect or any combination of aspects described below and/or in connection with one or more other processes described elsewhere herein.

In a first aspect, the first RAT is one of an LTE RAT or an NR RAT, and the second RAT is the other of the LTE RAT or the NR RAT. In a second aspect, alone or in combination with the first aspect, the slot timing difference is a maximum receive timing difference or a maximum transmit timing difference. In a third aspect, alone or in combination with one or more of the first and second aspects, the first cell and the second cell use overlapping frequency bands. In a fourth aspect, alone or in combination with one or more of the first through third aspects, the first cell and the second cell are non-co-located or use non-overlapping frequency bands.

In a fifth aspect, alone or in combination with one or more of the first through fourth aspects, performing the operation includes determining an RLF associated with the second cell based at least in part on whether the slot timing difference satisfies the threshold value, and terminating a connection to the second cell based at least in part on determining the RLF. In a sixth aspect, alone or in combination with one or more of the first through fifth aspects, the RLF is determined based at least in part on whether the slot timing difference satisfies the threshold value over a threshold time period.

In a seventh aspect, alone or in combination with one or more of the first through sixth aspects, performing the operation includes transmitting a measurement report for the second cell based at least in part on whether the slot timing difference satisfies the threshold value.

In an eighth aspect, alone or in combination with one or more of the first through seventh aspects, performing the operation includes determining an RLF associated with the second cell based at least in part on whether the slot timing difference satisfies the threshold value, associating the second cell with an indication of the RLF based at least in part on determining the RLF, and transmitting a measurement report for the second cell, in a subsequent cell search procedure, based at least in part on whether the second cell is associated with the indication of the RLF. In a ninth aspect, alone or in combination with one or more of the first through eighth aspects, the measurement report is transmitted based at least in part on whether the second cell is associated with a quantity of indications of RLF that satisfies another threshold value.

In a tenth aspect, alone or in combination with one or more of the first through ninth aspects, the second cell is indicated to the UE in connection with a blind cell addition procedure, and performing the operation includes establishing a connection to the second cell based at least in part on whether the slot timing difference satisfies the threshold value.

In an eleventh aspect, alone or in combination with one or more of the first through tenth aspects, the second cell is indicated to the UE in connection with a blind cell addition procedure, and performing the operation includes determining an RLF associated with the second cell based at least in part on whether the slot timing difference satisfies the threshold value, associating the second cell with an indication of the RLF based at least in part on determining the RLF, and establishing a connection to the second cell based at least in part on whether the second cell is associated with the indication of the RLF.

In a twelfth aspect, alone or in combination with one or more of the first through eleventh aspects, performing the operation includes communicating in the dual connectivity mode with the first cell and the second cell using a transmit power that satisfies another threshold value.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
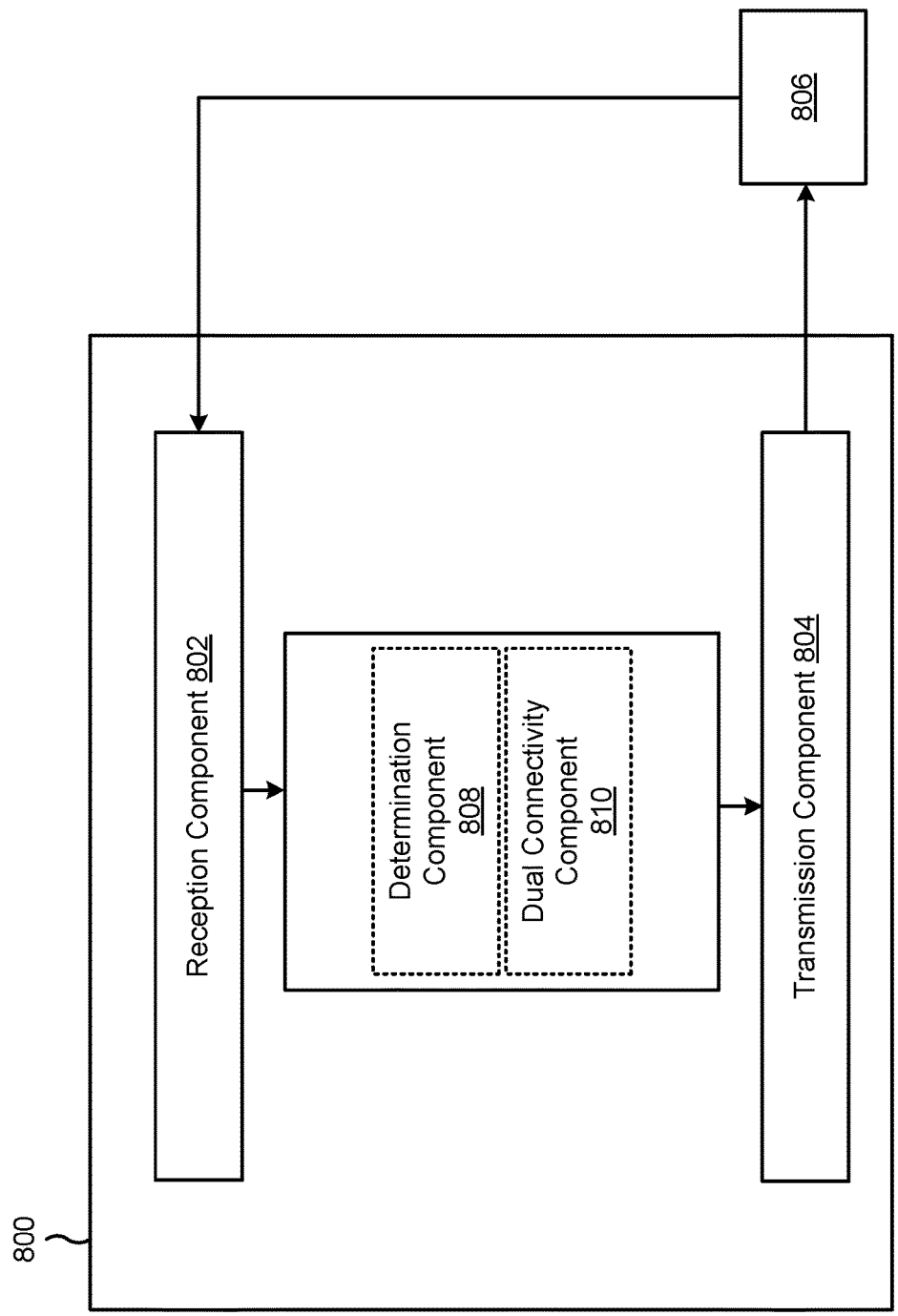
FIG. 8 is a diagram illustrating an example apparatus for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a determination component 808 or a dual connectivity component 810, among other examples.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The determination component 808 may determine whether a slot timing difference, between a first cell and a second cell for a dual connectivity mode, satisfies a threshold value. In some aspects, the first cell is a serving cell associated with a first RAT and the second cell is a serving cell or a candidate cell associated with a second RAT. The dual connectivity component 810 may perform an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of aspects of the present disclosure:

Aspect 1: A method of wireless communication performed by a UE, comprising: determining whether a slot timing difference, between a first cell and a second cell for a dual connectivity mode, satisfies a threshold value, wherein the first cell is a serving cell associated with a first RAT and the second cell is a serving cell or a candidate cell associated with a second RAT; and performing an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value.

Aspect 2: The method of aspect 1, wherein the first RAT is one of an LTE RAT or an NR RAT, and the second RAT is the other of the LTE RAT or the NR RAT.

Aspect 3: The method of any of aspects 1 through 2, wherein the slot timing difference is a maximum receive timing difference or a maximum transmit timing difference.

Aspect 4: The method of any of aspects 1 through 3, wherein the first cell and the second cell use overlapping frequency bands.

Aspect 5: The method of any of aspects 1 through 3, wherein the first cell and the second cell are non-co-located or use non-overlapping frequency bands.

Aspect 6: The method of any of aspects 1 through 5, wherein performing the operation comprises: determining an RLF associated with the second cell based at least in part on whether the slot timing difference satisfies the threshold value; and terminating a connection to the second cell based at least in part on determining the RLF.

Aspect 7: The method of aspect 6, wherein the RLF is determined based at least in part on whether the slot timing difference satisfies the threshold value over a threshold time period.

Aspect 8: The method of any of aspects 1 through 5, wherein performing the operation comprises: transmitting a measurement report for the second cell based at least in part on whether the slot timing difference satisfies the threshold value.

Aspect 9: The method of any of aspects 1 through 5, wherein performing the operation comprises: determining an RLF associated with the second cell based at least in part on whether the slot timing difference satisfies the threshold value; associating the second cell with an indication of the RLF based at least in part on determining the RLF; and transmitting a measurement report for the second cell, in a subsequent cell search procedure, based at least in part on whether the second cell is associated with the indication of the RLF.

Aspect 10: The method of aspect 9, wherein the measurement report is transmitted based at least in part on whether the second cell is associated with a quantity of indications of RLF that satisfies another threshold value.

Aspect 11: The method of any of aspects 1 through 5, wherein the second cell is indicated to the UE in connection with a blind cell addition procedure, and wherein performing the operation comprises: establishing a connection to the second cell based at least in part on whether the slot timing difference satisfies the threshold value.

Aspect 12: The method of any of aspects 1 through 5, wherein the second cell is indicated to the UE in connection with a blind cell addition procedure, and wherein performing the operation comprises: determining an RLF associated with the second cell based at least in part on whether the slot timing difference satisfies the threshold value; associating the second cell with an indication of the RLF based at least in part on determining the RLF; and establishing a connection to the second cell based at least in part on whether the second cell is associated with the indication of the RLF.

Aspect 13: The method of any of aspects 1 through 5, wherein performing the operation comprises: communicating in the dual connectivity mode with the first cell and the second cell using a transmit power that satisfies another threshold value.

Aspect 14: A UE for wireless communication, comprising: a memory; and one or more processors operatively coupled to the memory, the memory and the one or more processors configured to perform a method of any of aspects 1 through 13.

Aspect 15: A non-transitory computer-readable medium storing a set of instructions for wireless communication, the set of instructions comprising: one or more instructions that, when executed by one or more processors of a UE, cause the UE to perform a method of any of aspects 1 through 13.

Aspect 16: An apparatus for wireless communication, comprising at least one means for performing a method of any of aspects 1 through 13.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining whether a slot timing difference, between a first cell and a second cell for a dual connectivity mode, satisfies a threshold value,
        wherein the slot timing difference corresponds to a difference between a slot timing of the first cell and a slot timing of the second cell, and
        wherein the first cell is a serving cell associated with a first radio access technology (RAT) and the second cell is a serving cell or a candidate cell associated with a second RAT; and
    performing an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value,
        wherein performing the operation includes determining a radio link failure (RLF) associated with the second cell based at least in part on whether the slot timing difference satisfies the threshold value.

2. The method of claim 1, wherein the first RAT is one of a Long Term Evolution (LTE) RAT or a New Radio (NR) RAT, and the second RAT is the other of the LTE RAT or the NR RAT.

3. The method of claim 1, wherein the slot timing difference is a maximum receive timing difference or a maximum transmit timing difference.

4. The method of claim 1, wherein the first cell and the second cell use overlapping frequency bands.

5. The method of claim 1, wherein the first cell and the second cell are non-co-located or use non-overlapping frequency bands.

6. The method of claim 1, wherein performing the operation comprises:
    terminating a connection to the second cell based at least in part on determining the RLF.

7. The method of claim 6, wherein the RLF is determined based at least in part on whether the slot timing difference satisfies the threshold value over a threshold time period.

8. The method of claim 1, wherein performing the operation comprises:
    transmitting a measurement report for the second cell based at least in part on whether the slot timing difference satisfies the threshold value.

9. The method of claim 1, wherein performing the operation comprises:
    associating the second cell with an indication of the RLF based at least in part on determining the RLF; and
    transmitting a measurement report for the second cell, in a subsequent cell search procedure, based at least in part on whether the second cell is associated with the indication of the RLF.

10. The method of claim 9, wherein the measurement report is transmitted based at least in part on whether the second cell is associated with a quantity of indications of RLF that satisfies another threshold value.

11. The method of claim 1, wherein the second cell is indicated to the UE in connection with a blind cell addition procedure,
    and wherein performing the operation comprises:
        establishing a connection to the second cell based at least in part on whether the slot timing difference satisfies the threshold value.

12. The method of claim 1, wherein the second cell is indicated to the UE in connection with a blind cell addition procedure, and
    wherein performing the operation comprises:
        associating the second cell with an indication of the RLF based at least in part on determining the RLF; and
        establishing a connection to the second cell based at least in part on whether the second cell is associated with the indication of the RLF.

13. The method of claim 1, wherein performing the operation comprises:
    communicating in the dual connectivity mode with the first cell and the second cell using a transmit power that satisfies another threshold value.

14. A user equipment (UE) for wireless communication, comprising:
    a memory; and
    one or more processors coupled with the memory and configured to cause the UE to:
        determine whether a slot timing difference, between a first cell and a second cell for a dual connectivity mode, satisfies a threshold value,
            wherein the slot timing difference corresponds to a difference between a slot timing of the first cell and a slot timing of the second cell, and
            wherein the first cell is a serving cell associated with a first radio access technology (RAT) and the second cell is a serving cell or a candidate cell associated with a second RAT; and
        perform an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value,
            wherein the one or more processors are configured to cause the UE to perform the operation by being configured to cause the UE to determine a radio link failure (RLF) associated with the second cell based at least in part on whether the slot timing difference satisfies the threshold value.

15. The UE of claim 14, wherein the first RAT is one of a Long Term Evolution (LTE) RAT or a New Radio (NR) RAT, and the second RAT is the other of the LTE RAT or the NR RAT.

16. The UE of claim 14, wherein the slot timing difference is a maximum receive timing difference or a maximum transmit timing difference.

17. The UE of claim 14, wherein the first cell and the second cell use overlapping frequency bands.

18. The UE of claim 14, wherein the first cell and the second cell are non-co-located or use non-overlapping frequency bands.

19. The UE of claim 14, wherein the one or more processors are configured to cause the UE to perform the operation by being configured to cause the UE to:
    terminate a connection to the second cell based at least in part on determining the RLF.

20. The UE of claim 19, wherein the RLF is determined based at least in part on whether the slot timing difference satisfies the threshold value over a threshold time period.

21. The UE of claim 14, wherein the one or more processors are configured to cause the UE to perform the operation by being configured to cause the UE to:
  transmit a measurement report for the second cell based at least in part on whether the slot timing difference satisfies the threshold value.

22. The UE of claim 14, wherein the one or more processors are configured to cause the UE to perform the operation by being configured to cause the UE to:
  associate the second cell with an indication of the RLF based at least in part on determining the RLF; and
  transmit a measurement report for the second cell, in a subsequent cell search procedure, based at least in part on whether the second cell is associated with the indication of the RLF.

23. The UE of claim 22, wherein the measurement report is transmitted based at least in part on whether the second cell is associated with a quantity of indications of RLF that satisfies another threshold value.

24. The UE of claim 14, wherein the second cell is indicated to the UE in connection with a blind cell addition procedure,
  and wherein the one or more processors are configured to cause the UE to perform the operation by being configured to cause the UE to:
    establish a connection to the second cell based at least in part on whether the slot timing difference satisfies the threshold value.

25. The UE of claim 14, wherein the second cell is indicated to the UE in connection with a blind cell addition procedure, and
  wherein the one or more processors are configured to cause the UE to perform the operation by being configured to cause the UE to:
    associate the second cell with an indication of the RLF based at least in part on determining the RLF; and
    establish a connection to the second cell based at least in part on whether the second cell is associated with the indication of the RLF.

26. The UE of claim 14, wherein the one or more processors are configured to cause the UE to perform the operation by being configured to cause the UE to:
  communicate in the dual connectivity mode with the first cell and the second cell using a transmit power that satisfies another threshold value.

27. A non-transitory computer-readable medium storing a set of instructions for wireless communication, the set of instructions comprising:
  one or more instructions that, when executed by one or more processors of a user equipment (UE), cause the UE to:
    determine whether a slot timing difference, between a first cell and a second cell for a dual connectivity mode, satisfies a threshold value,
      wherein the slot timing difference corresponds to a difference between a slot timing of the first cell and a slot timing of the second cell, and
      wherein the first cell is a serving cell associated with a first radio access technology (RAT) and the second cell is a serving cell or a candidate cell associated with a second RAT; and
    perform an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value,
      wherein the one or more instructions, that cause the UE to perform the operation, cause the UE to determine a radio link failure (RLF) associated with the second cell based at least in part on whether the slot timing difference satisfies the threshold value.

28. The non-transitory computer-readable medium of claim 27, wherein the one or more instructions, that cause the UE to perform the operation, cause the UE to:
  terminate a connection to the second cell based at least in part on determining the RLF.

29. An apparatus for wireless communication, comprising:
  means for determining whether a slot timing difference, between a first cell and a second cell for a dual connectivity mode, satisfies a threshold value,
    wherein the slot timing difference corresponds to a difference between a slot timing of the first cell and a slot timing of the second cell, and
    wherein the first cell is a serving cell associated with a first radio access technology (RAT) and the second cell is a serving cell or a candidate cell associated with a second RAT; and
  means for performing an operation to prevent the dual connectivity mode with the second cell, establish the dual connectivity mode with the second cell, maintain the dual connectivity mode with the second cell, or terminate the dual connectivity mode with the second cell based at least in part on whether the slot timing difference satisfies the threshold value,
    wherein the means for performing the operation includes means for determining a radio link failure (RLF) associated with the second cell based at least in part on whether the slot timing difference satisfies the threshold value.

30. The apparatus of claim 29, wherein the means for performing the operation comprises:
  means for terminating a connection to the second cell based at least in part on determining the RLF.

* * * * *